(12) United States Patent
Gondo

(10) Patent No.: US 10,061,992 B2
(45) Date of Patent: Aug. 28, 2018

(54) IMAGE DISPLAY SYSTEM

(71) Applicant: SUZUKI MOTOR CORPORATION, Hamamatsu-shi, Shizuoka (JP)

(72) Inventor: Yuki Gondo, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 182 days.

(21) Appl. No.: 15/211,667

(22) Filed: Jul. 15, 2016

(65) Prior Publication Data

US 2017/0032195 A1 Feb. 2, 2017

(30) Foreign Application Priority Data

Jul. 31, 2015 (JP) ................................. 2015-152282

(51) Int. Cl.
| | |
|---|---|
| G06K 9/00 | (2006.01) |
| G02B 27/00 | (2006.01) |
| G02B 27/01 | (2006.01) |
| G06F 3/01 | (2006.01) |
| H04N 5/225 | (2006.01) |
| H04N 5/232 | (2006.01) |

(52) U.S. Cl.
CPC ..... *G06K 9/00791* (2013.01); *G02B 27/0093* (2013.01); *G02B 27/017* (2013.01); *G02B 27/0172* (2013.01); *G06F 3/012* (2013.01); *H04N 5/2259* (2013.01); *B60R 2300/101* (2013.01); *B60R 2300/8066* (2013.01); *G02B 2027/014* (2013.01); *G02B 2027/0138* (2013.01); *H04N 5/23293* (2013.01)

(58) Field of Classification Search
CPC .............. G02B 27/017; G02B 27/0093; G02B 27/0172; G06F 3/012; G06K 9/00791
See application file for complete search history.

(56) References Cited

U.S. PATENT DOCUMENTS

| | | | |
|---|---|---|---|
| 2008/0278821 A1* | 11/2008 | Rieger | G02B 27/017 |
| | | | 359/630 |
| 2014/0347450 A1* | 11/2014 | Han | B60R 1/00 |
| | | | 348/48 |
| 2016/0025975 A1* | 1/2016 | Rabii | G06T 1/20 |
| | | | 345/173 |
| 2016/0025978 A1* | 1/2016 | Mallinson | G02B 27/0172 |
| | | | 345/8 |

FOREIGN PATENT DOCUMENTS

| | | |
|---|---|---|
| JP | 2001-105973 A | 4/2001 |
| JP | 2001-151016 A | 6/2001 |

* cited by examiner

*Primary Examiner* — Abbas Abdulselam
(74) *Attorney, Agent, or Firm* — Stein IP, LLC

(57) ABSTRACT

There is provided an image display system. An imaging device is provided for a vehicle and configured to capture a partial area of surroundings of the vehicle. A display device is provided for a head-mounted device, which is to be mounted to user's head, and has a display screen. The display screen is disposed at a position that is within a front viewing field of a user wearing the head-mounted device. A control device is configured to display an image captured by the imaging device on the display screen.

8 Claims, 9 Drawing Sheets

IMAGE DISPLAY SYSTEM

CROSS-REFERENCE TO RELATED APPLICATIONS

The disclosure of Japanese Patent Application No. 2015-152282 filed on Jul. 31, 2015, including specification, drawings and claims is incorporated herein by reference in its entirety.

TECHNICAL FIELD

The disclosure relates to an image display system configured to display an image, which is to be captured by an imaging device provided for a vehicle, on a display screen attached to a head-mounted device, which a driver of the vehicle wears, and to enable the driver to check the image during driving of the vehicle.

BACKGROUND

Patent Document 1 or 2 discloses a technology where a CCD camera is provided for a two-wheeled motor vehicle, a monitor display is provided on an instrument panel provided in front of a handle of the two-wheeled motor vehicle, and an image captured by the CCD camera is projected to the monitor display. A driver of the two-wheeled motor vehicle can see the image projected to the monitor display during driving.

Patent Document 1: Japanese Patent Application Publication No. 2001-105973A

Patent Document 2: Japanese Patent Application Publication No. 2001-151016A

However, according to the technology disclosed in Patent Document 1 or 2, since the monitor display is arranged on the instrument panel of the two-wheeled motor vehicle, the driver should largely move downwards a line of sight so as to see the image displayed on the monitor display during the driving. However, the driver should not neglect seeing the front of the two-wheeled motor vehicle, which is required for safe driving. Therefore, it is not easy for the driver to see the monitor display, which increases the burden of the driver.

Also, since the monitor display arranged on the instrument panel of the two-wheeled motor vehicle is located at a position distant from the driver's eyes, it is difficult for the driver to clearly recognize contents of the image.

Regarding this, when the image to be displayed on the monitor display is enlarged, the driver can clearly recognize the contents of the image. However, when the image is enlarged, a range of the image to be displayed on the monitor display is reduced, so that it is not possible to display a wide range image.

SUMMARY

The disclosure has been made in view of the above situations, and a first object of the disclosure is to provide an image display system by which a driver of a vehicle can easily and clearly recognize an image captured by an imaging device during driving.

Also, a second object of the disclosure is to provide an image display system by which the driver of the vehicle can see a wide range image during the driving.

There is provided an image display system comprising: an imaging device provided for a vehicle and configured to capture a partial area of surroundings of the vehicle; a display device provided for a head-mounted device, which is to be mounted to user's head, and having a display screen, the display screen being disposed at a position that is within a front viewing field of a user wearing the head-mounted device; and a control device configured to display an image captured by the imaging device on the display screen.

According to the image display system of the disclosure, the image is displayed on the display screen of the display device provided for the head-mounted device. Thereby, the user wearing the head-mounted device can easily see the image captured by the imaging device simply by moving a line of sight by a short distance. Also, since the image is displayed close to the user's eyes, the user can clearly recognize contents of the image.

The image display system may further comprise: a vehicle direction sensor configured to detect a direction of the vehicle; and a head direction sensor configured to detect a direction of the head. The control device may comprise: a head angle calculation unit configured to calculate a head angle, which is an angle between the direction of the vehicle and the direction of the head, based on the direction of the vehicle detected by the vehicle direction sensor and the direction of the head detected by the head direction sensor; and an image display control unit configured to change an area that is to be displayed on the display screen as an image of the surroundings of the vehicle, in accordance with the head angle calculated by the head angle calculation unit.

According to the above aspect of the disclosure, the user who wears the head-mounted device and gets on the vehicle can change the area, which is to be displayed on the display screen as an image of the surroundings of the vehicle, by a simple operation of changing the direction of the user's head (for example, a direction of the face) with respect to the direction of the vehicle (for example, a traveling direction of the vehicle), so that the user can see an image of the wide range area in the surroundings of the vehicle.

In the image display system, the image display control unit may be configured to display a part of the image captured by the imaging device on the display screen, and to change an image range, which is to be displayed on the display screen, of the image captured by the imaging device, in accordance with the head angle calculated by the head angle calculation unit.

According to the above aspect of the disclosure, since the area, which is to be displayed on the display screen as an image of the surroundings of the vehicle, can be changed by the image processing, it is possible to simplify the configuration of the imaging device. For example, it is possible to change the area, which is to be displayed on the display screen as an image of the surroundings of the vehicle, by a single imaging device of which an imaging direction is fixed.

In the image display system, the image display control unit may be configured to change an imaging direction of the imaging device, in accordance with the head angle calculated by the head angle calculation unit.

According to the above aspect of the disclosure, since the area, which is to be displayed on the display screen as an image of the surroundings of the vehicle, can be changed by the control of the imaging device, it is possible to simplify the configuration of the image processing. The configuration of changing the imaging direction of the imaging device may be a configuration of moving a part or all of the imaging device or may be a configuration of outputting images from a plurality of imaging devices having different imaging directions, respectively, and selecting an image to be displayed on the display screen from the images.

In the image display system, the image display control unit may not display the image captured by the imaging device on the display screen when the head angle calculated by the head angle calculation unit is within a predetermined reference angle range including zero (0) degree.

According to the above aspect of the disclosure, when the user looks forward, the image of the display screen may not be displayed. Thereby, when it is not necessary to check an image through the display screen, for example, the user simply looks forward, so that it is possible to secure a wide front view.

The image display system may further comprise: a first wireless communication device provided for the head-mounted device; and a second wireless communication device provided for the vehicle. The first wireless communication device may be configured to transmit a head direction detection signal, which is to be output from a head direction sensor provided for the head-mounted device and indicates the direction of the head, to the second wireless communication device, and the second wireless communication device may be configured to output the head direction detection signal received from the first wireless communication device to the head angle calculation unit of the control device provided for the vehicle. The second wireless communication device may be configured to transmit an image signal, which is to be output from the image display control unit and corresponds to an image to be displayed on the display screen, to the first wireless communication device, and the first wireless communication device may be configured to output the image signal received from the second wireless communication device to the display device.

According to the above aspect of the disclosure, since it is possible to omit a cable configured to connect the head-mounted device and the vehicle each other, the user can easily get on or get off the vehicle or easily drive the vehicle. Also, the user can simply perform the operation of changing the direction of the head so as to change the area of the surroundings of the vehicle, which is to be displayed on the display screen as the image.

In the image display system, the display device, the head direction sensor and the first wireless communication device may be integrated and attached to the head-mounted device.

According to the above aspect of the disclosure, the display device, the head direction sensor and the first wireless communication device can be easily attached to the head-mounted device. Also, even when the head-mounted device is small, such as a helmet, goggles or the like, it is possible to attach the display device, the head direction sensor and the first wireless communication device to a small space having the head-mounted device.

In the image display system, the imaging device may be configured to capture a rear of the vehicle, the head angle calculation unit may be configured to calculate, as the head angle, an angle in a horizontal plane between the direction of the vehicle and the direction of the head, based on the direction of the vehicle detected by the vehicle direction sensor and the direction of the head detected by the head direction sensor, and the control device may comprise an image reversal processing unit configured to reverse an image to be displayed on the display screen in a horizontal direction.

According to the above aspect of the disclosure, the user who wears the head-mounted device and gets on the vehicle can easily and clearly recognize a rear situation of the vehicle by seeing the display screen disposed close to the user's eyes. Also, since the user can change the area, which is to be displayed on the display screen as the rear image of the vehicle, by changing the direction of the user's head in the horizontal direction, the user can check the rear wide range area of the vehicle. Also, it is possible to generate an image, by which the rear situation of the vehicle can be easily recognized, by reversing the image displayed on the display screen in the horizontal direction.

In the image display system, wherein the control device may be configured to display information indicating a vehicle speed, an engine revolution or a gear position of the vehicle or indicating that the vehicle is not normal on the display screen.

According to the above aspect of the disclosure, since the information indicative of the states of the vehicle is displayed on the display screen disposed close to the user's eyes, the user can easily and clearly recognize the states of the vehicle.

According to the disclosure, the driver of the vehicle can easily and clearly recognize the image captured by the imaging device during the driving. Also, according to the disclosure, the driver of the vehicle can see the wide range image during the driving.

DETAILED DESCRIPTION OF THE EMBODIMENTS

First Illustrative Embodiment

Figure 1:
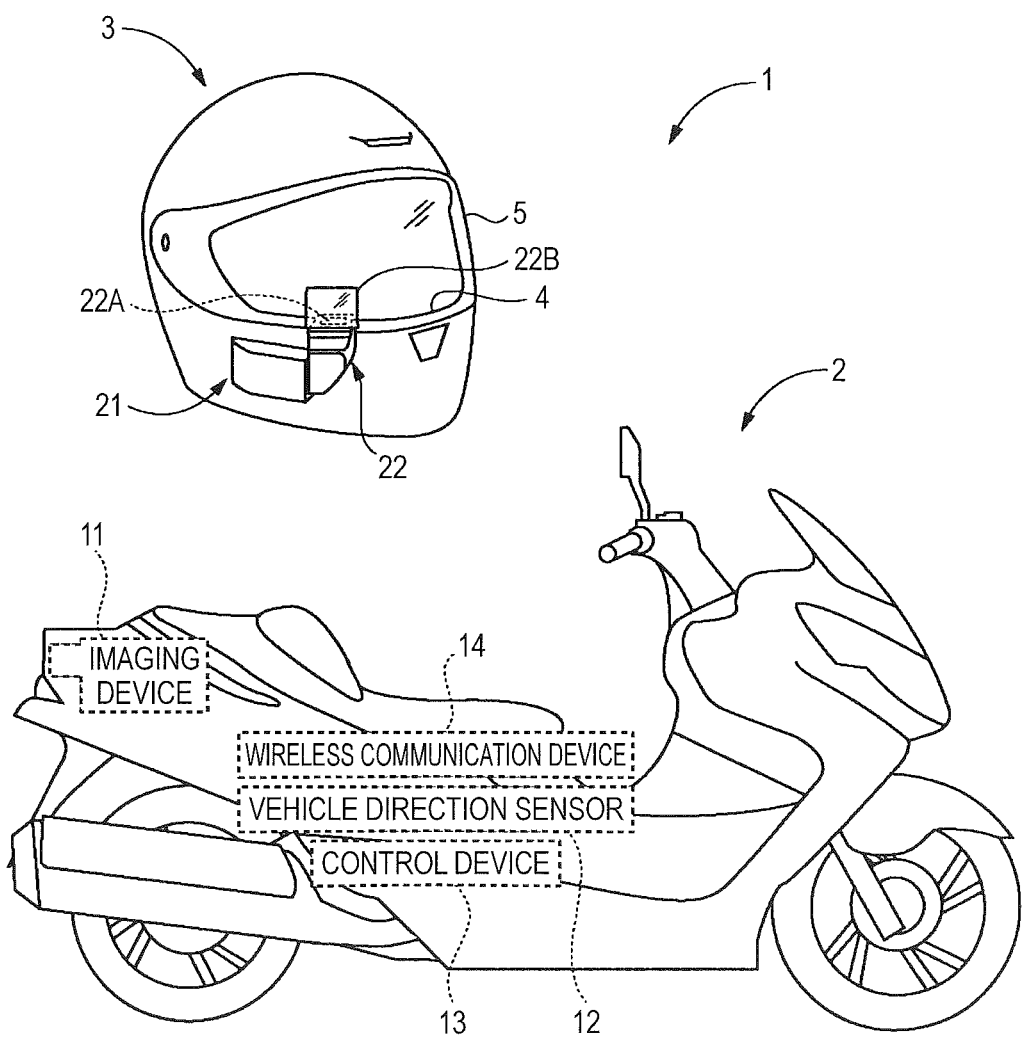
FIG. 1 depicts an image display system according to a first illustrative embodiment of the disclosure.
Figure 2:
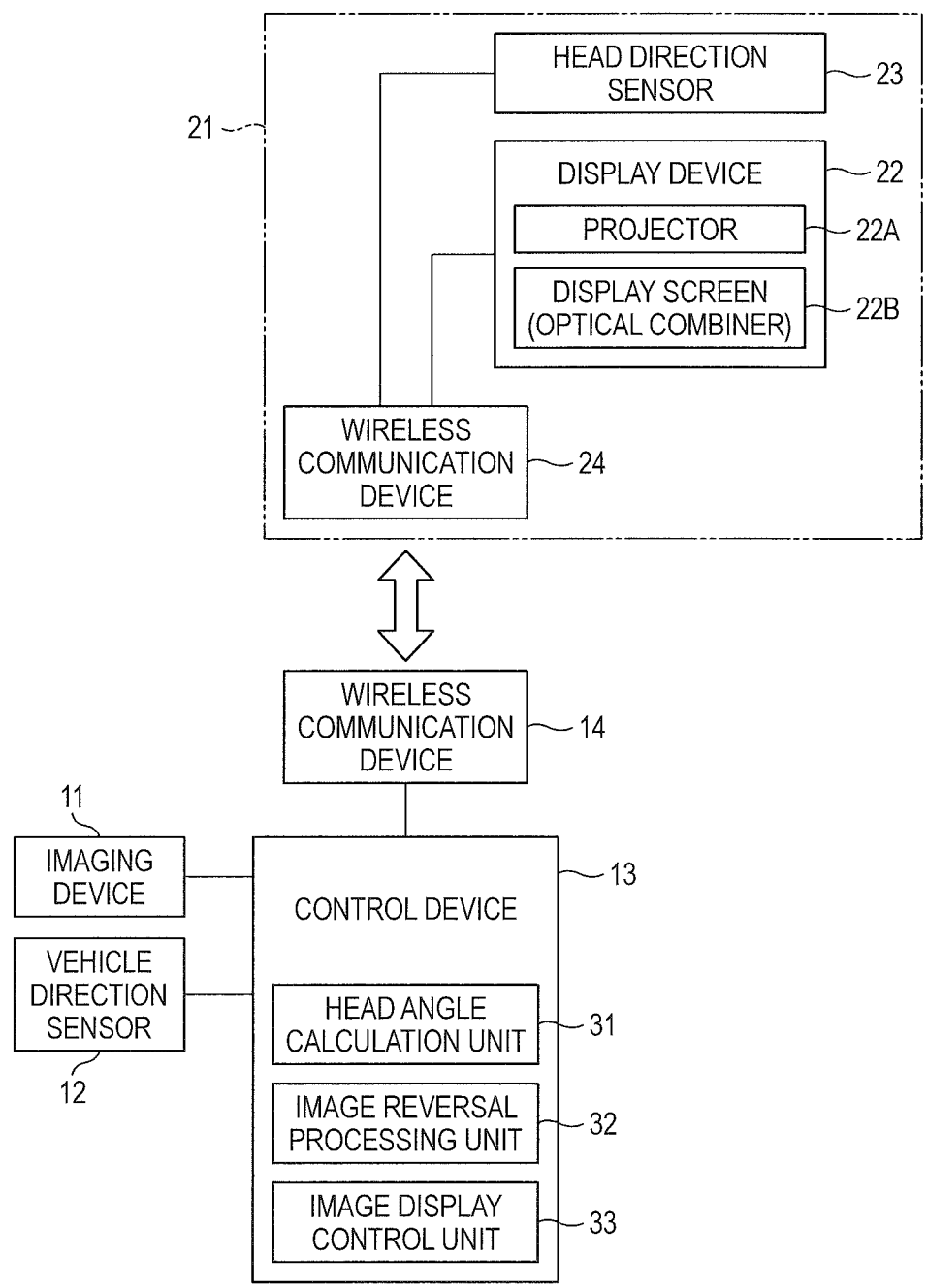
FIG. 2 is a block diagram depicting the image display system according to the first illustrative embodiment of the disclosure.

FIGS. 1 and 2 depict an image display system according to a first illustrative embodiment of the disclosure. As shown in FIG. 1, in the first illustrative embodiment, the image display system of the disclosure is applied to a system configured to display a rear image of a two-wheeled motor vehicle. In FIG. 1, an image display system 1 includes an imaging device 11, a vehicle direction sensor 12, a control device 13 and a wireless communication device 14, which are provided for a two-wheeled motor vehicle 2 as the vehicle. As described later, the imaging device 11 is provided at a rear part of the two-wheeled motor vehicle 2, and the vehicle direction sensor 12 and the control device 13 is provided below a seat of the two-wheeled motor vehicle 2, for example.

In the meantime, FIG. 1 exemplifies a scooter as the two-wheeled motor vehicle. However, the vehicle for which the imaging device 11, the vehicle direction sensor 12, the control device 13 and the wireless communication device 14 are provided may be a two-wheeled motor vehicle of other types, a saddle type vehicle, rather than the two-wheeled motor vehicle, or a four-wheeled vehicle, and may be a bicycle without being limited to the automobile. A wheelchair is also possible.

Also, the image display system 1 has a head-mounted display unit 21. The head-mounted display unit 21 is provided for a helmet 3, as the head-mounted device. Also, as shown in FIG. 2, the head-mounted display unit 21 has a display device 22, a head direction sensor 23 and a wireless communication device 24. The head-mounted display unit 21 is a unit having the display device 22, the head direction sensor 23 and the wireless communication device 24, which are integrated. For example, the corresponding elements are accommodated into one common case, so that the unit is configured.

As shown in FIG. 1, a front part of the helmet 3 is formed with a window hole 4 for securing a front viewing field of a user wearing the helmet 3. Also, the front part of the helmet 3 is attached with a transparent shield plate 5 for shielding the window hole 4. The head-mounted display unit 21 is attached to a front right side of the helmet 3 below the window hole 4. In this way, the display device 22, the head direction sensor 23 and the wireless communication device 24 are integrated as the head-mounted display unit 21, so that the display device 22, the head direction sensor 23 and the wireless communication device 24 can be easily attached to the helmet 3.

In the meantime, the helmet 3 shown in FIG. 1 is a full face-type helmet. However, the helmet 3 is not limited to the full face-type helmet. Also, the position of the helmet 3 to which the head-mounted display unit 21 is to be attached is not particularly limited. That is, the head-mounted display unit can be attached to other positions inasmuch as a display screen 22B is within the front viewing field of the user. Also, in the first illustrative embodiment, the head-mounted display unit 21 is attached to an outer surface of the helmet 3. However, the head-mounted display unit 21 may be provided inside the helmet 3.

Figure 3:
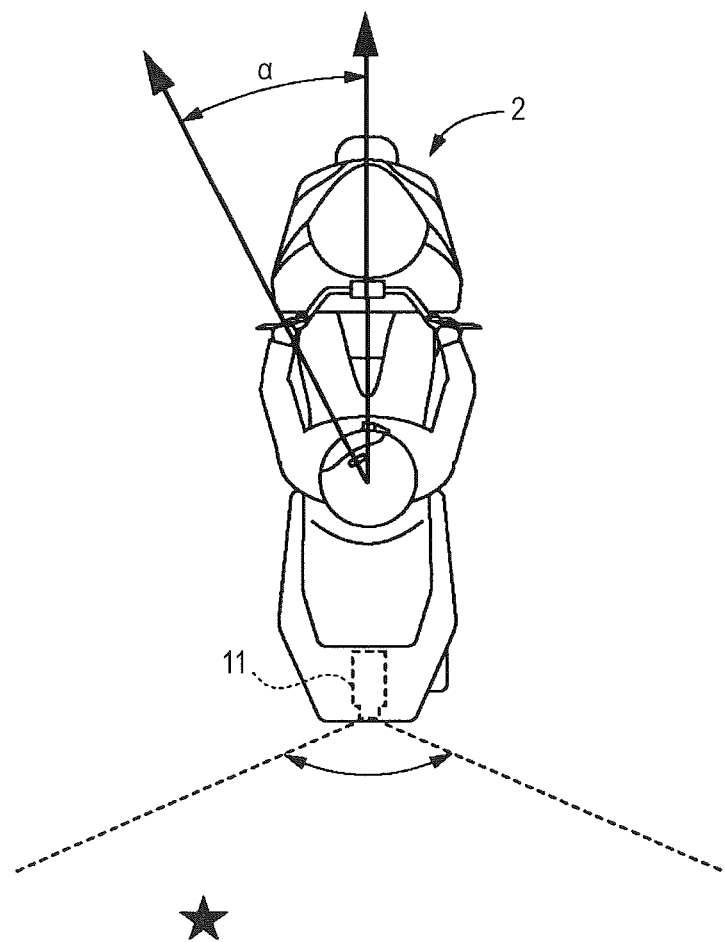
FIG. 3 depicts a two-wheeled motor vehicle to which the image display system according to the first illustrative embodiment of the disclosure is applied.

The imaging device 11 provided for the two-wheeled motor vehicle 2 is a device configured to capture a rear of the two-wheeled motor vehicle 2, as a partial area of surroundings of the two-wheeled motor vehicle 2, and is a CCD camera, for example. Herein, FIG. 3 depicts the two-wheeled motor vehicle 2 from above. As shown in FIG. 3, the imaging device 11 is provided at a rear part of the two-wheeled motor vehicle 2. Meanwhile, the imaging device 11 may be provided at other places of the two-wheeled motor vehicle 2 inasmuch as it can capture the rear of the two-wheeled motor vehicle 2.

Also, an imaging direction of the imaging device 11 is right behind the two-wheeled motor vehicle 2. Also, as shown in FIG. 3, an imaging range of the imaging device 11 is wide in a horizontal direction. When the two-wheeled motor vehicle 2 travels straight in one of a plurality of lanes of a road, for example, the imaging device 11 can capture not only a vehicle that travels behind the two-wheeled motor vehicle 2 in the same lane as the lane in which the two-wheeled motor vehicle 2 travels but also at least a vehicle that travels behind (rear left side) the two-wheeled motor vehicle 2 in a left lane of the lane in which the two-wheeled motor vehicle 2 travels and a vehicle that travels behind (rear right side) the two-wheeled motor vehicle 2 in a right lane of the lane in which the two-wheeled motor vehicle 2 travels, at the same time. Also, the imaging device 11 is configured to output an imaging signal indicative of the captured image to the control device 13.

In FIG. 1, the vehicle direction sensor 12 provided for the two-wheeled motor vehicle 2 is a sensor configured to detect a direction of the two-wheeled motor vehicle 2. For example, the vehicle direction sensor 12 is an azimuth angle sensor configured to detect an azimuth angle. In the meantime, as the vehicle direction sensor 12, a sensor configured by combining an azimuth angle sensor, an angular speed sensor and an acceleration sensor may also be used. The vehicle direction sensor 12 is configured to detect an azimuth angle of the two-wheeled motor vehicle 2, specifically, an azimuth angle of the front of the two-wheeled motor vehicle 2 or an azimuth angle in a traveling direction of the two-wheeled motor vehicle 2. The vehicle direction sensor 12 is configured to output a vehicle direction detection signal indicative of the azimuth angle of the two-wheeled motor vehicle 2 to the control device 13.

The display device 22, which is a part of the head-mounted display unit 21 provided for the helmet 3, is a small-sized device having a projector 22A configured to project an image and a display screen 22B configured by an optical combiner configured to reflect an image from the projector 22A. As shown in FIG. 1, the display screen 22B is disposed at a position within the front viewing field of the user wearing the helmet 3. For example, the display screen 22B is disposed at a front right side of the helmet 3 below the window hole 4. As the optical combiner configuring the display screen 22B, a half mirror is used. The optical combiner is configured to reflect an image from the projector 22A provided below the optical combiner so that the image is within the front viewing field of the user, and is also configured to penetrate light originating from the front of the user. The user can check an image from the projector 22A, a front vehicle or a right front vehicle in front of the display screen 22B, road situations, scenes and the like by seeing the display screen 22B. Therefore, the display screen 22B is configured by the optical combiner, so that it is possible to display the image and to secure the wide front viewing field of the user. In the meantime, the display device 22 may also be configured by a liquid crystal monitor or an organic light emitting element display. In this case, since the display screen shields the light originating from the front of the user, it is preferably to set a position of the display screen at an end portion or a corner of the front viewing field of the user so that the display screen does not interfere with the front check of the user.

Figure 4:
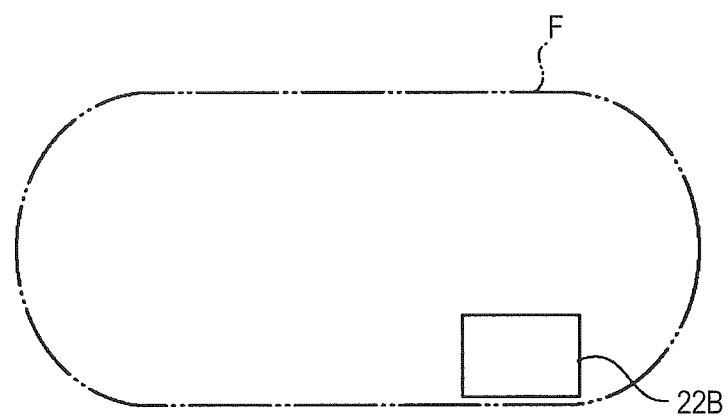
FIG. 4 depicts a front viewing field of a user who wears a helmet to which the image display system according to the first illustrative embodiment of the disclosure is applied.

FIG. 4 depicts the front viewing field of the user wearing the helmet 3. As shown in FIG. 4, the display screen 22B is disposed at a right lower part of the front viewing field F of the user wearing the helmet 3. The user can see an image displayed on the display screen 22B by moving a line of sight from a state where the user looks forward to a right lower side by a short distance.

In the meantime, the position of the display screen 22B in the front viewing field F of the user wearing the helmet 3 may be a position at which the user is not disturbed when looking forward, for example, any position except for a center of the front viewing field F, and is not limited to the right lower part of the front viewing field F. For example, the position may be a left lower part, a right upper part or a left upper part. Also, the position may be an upper part, a lower part, a left part or a right part of the front viewing field F. In the meantime, the attachment position of the head-mounted display unit 21 to the helmet 3 is determined depending on the position of the display screen 22B in the front viewing field F. For example, when the position of the display screen 22B is set to a left lower part of the front viewing field F, the head-mounted display unit 21 is attached to a front left side of the helmet 3 below the window hole 4.

In FIG. 2, the head direction sensor 23, which is a part of the head-mounted display unit 21 provided for the helmet 3, is a sensor configured to detect a direction of the head of the user wearing the helmet 3. For example, the head direction sensor 23 is an azimuth angle sensor configured to detect an azimuth angle. In the meantime, as head direction sensor 23, a sensor configured by combining an azimuth angle sensor, an angular speed sensor and an acceleration sensor may also be used. The head direction sensor 23 is configured to detect an azimuth angle of the user's head, specifically, an azimuth angle of the front of the head of the user wearing the helmet 3 or an azimuth angle of the face. The head direction sensor 23 is configured to output a head direction detection signal indicative of the azimuth angle of the user's head to the control device 13.

The control device 13 provided for the two-wheeled motor vehicle 2 is a device configured to display an image captured by the imaging device 11 on the display screen 22B. The control device 13 has a CPU, a storage device and the like. In the meantime, the control device 13 may be implemented as a part of a control unit configured to control an engine of the two-wheeled motor vehicle 2.

As shown in FIG. 2, the control device 13 has a head angle calculation unit 31, an image reversal processing unit 32 and an image display control unit 33. The corresponding units are implemented by enabling the CPU of the control device 13 to read and execute a computer program stored in the storage device.

The head angle calculation unit 31 is configured to calculate a head angle α, which is an angle between the azimuth angle of the two-wheeled motor vehicle 2 and the azimuth angle of the user's head, based on the azimuth angle of the two-wheeled motor vehicle 2 detected by the vehicle direction sensor 12 and the azimuth angle of the user's head detected by the head direction sensor 23, as shown in FIG. 3. The image reversal processing unit 32 is configured to execute processing of reversing an image to be displayed on the display screen 22B in a horizontal direction. The image display control unit 33 is configured to change an area, which is to be displayed on the display screen 22B as a rear image of the two-wheeled motor vehicle 2, in accordance with the head angle α calculated by the head angle calculation unit 31. Specifically, the image display control unit 33 is configured to display a part of an image captured by the imaging device 11 on the display screen 22B. Also, the image display control unit 33 is configured to change an image range, which is to be displayed on the display screen 22B, of the image captured by the imaging device 11 in accordance with the head angle α calculated by the head angle calculation unit 31. Also, the image display control unit 33 is configured to output an image signal of the image to be displayed on the display screen 22B. The processing that is to be executed by the head angle calculation unit 31, the image reversal processing unit 32 and the image display control unit 33 will be described in detail later.

Also, in FIG. 2, the control device 13 provided for the two-wheeled motor vehicle 2 and the head-mounted display unit 21 provided for the helmet 3 can exchange information each other by wireless communication. That is, the two-wheeled motor vehicle 2 is provided with the wireless communication device 14, and the head-mounted display unit 21 is provided with the wireless communication device 24. The wireless communication device 24 provided for the head-mounted display unit 21 is configured to transmit the head direction detection signal output from the head direction sensor 23 to the wireless communication device 14 provided for the two-wheeled motor vehicle 2, and the wireless communication device 14 is configured to output the head direction detection signal received from the wireless communication device 24 to the head angle calculation unit 31 of the control device 13 provided for the two-wheeled motor vehicle 2. Also, the wireless communication device 14 provided for the two-wheeled motor vehicle 2 is configured to transmit an image signal output from the image display control unit 33 to the wireless communication device 24 provided for the head-mounted display unit 21, and the wireless communication device 24 is configured to output the image signal received from the wireless communication device 14 to the display device 22. In this way, since the control device 13 provided for the two-wheeled motor vehicle 2 and the head-mounted display unit 21 provided for the helmet 3 can exchange the information each other by the wireless communication, it is not necessary to connect the two-wheeled motor vehicle 2 and the helmet 3 by a cable. Since there is no cable between the two-wheeled motor vehicle 2 and the helmet 3, the user can easily get on or get off the two-wheeled motor vehicle 2 or easily drive the two-wheeled motor vehicle 2. Also, the user can simply perform the operation of changing the direction of the head so as to change the rear area of the two-wheeled motor vehicle 2, which is to be displayed on the display screen 22B as an image.

Figure 5:
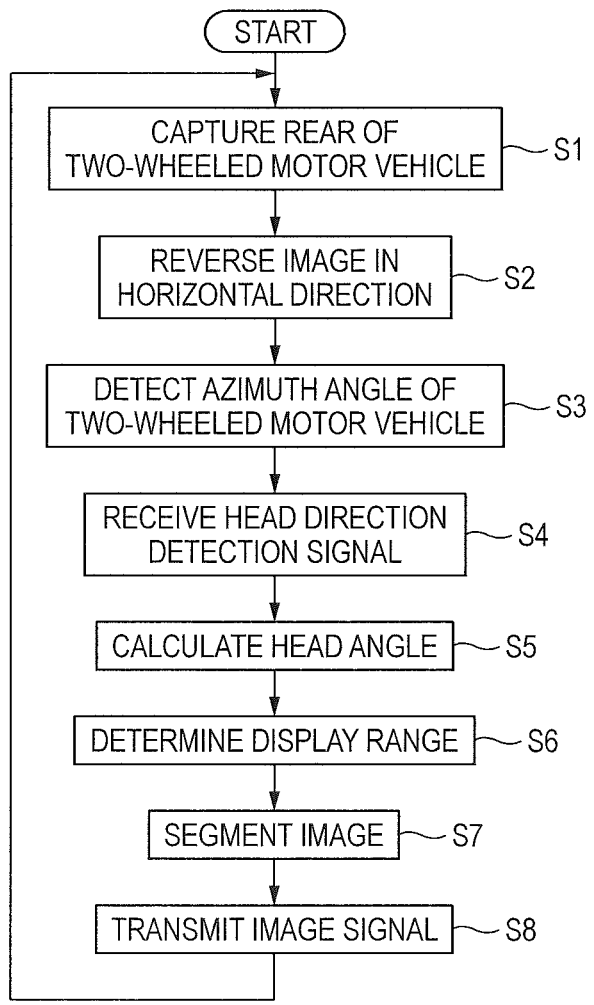
FIG. 5 is a flowchart depicting operations of a device provided for the two-wheeled motor vehicle in the image display system according to the first illustrative embodiment of the disclosure.
Figure 6A:
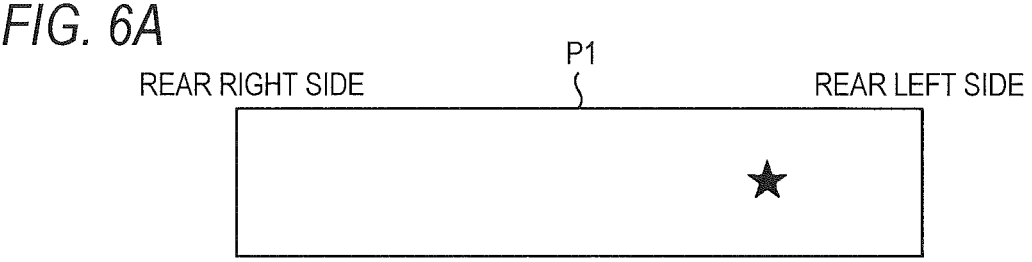
FIGS. 6A to 6E depict image processing in the image display system according to the first illustrative embodiment of the disclosure.
Figure 6B:
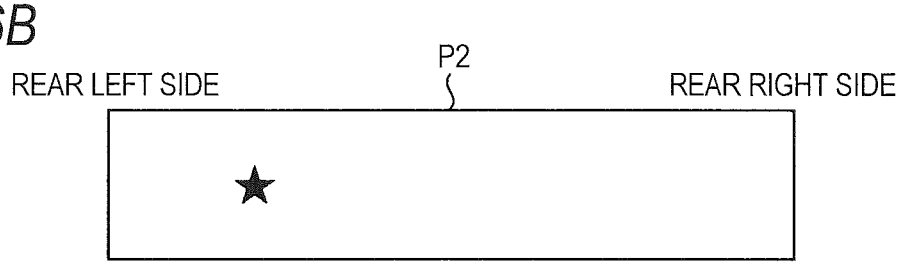
Figure 6C:
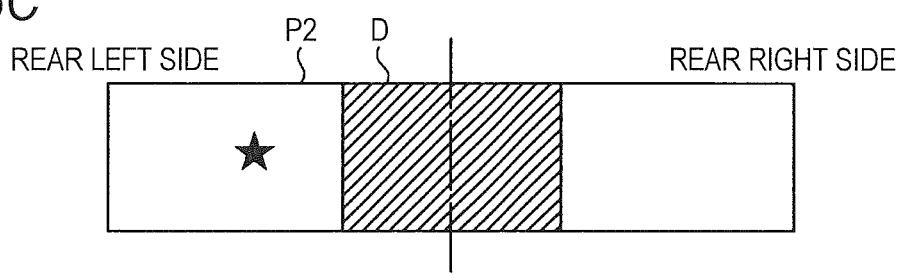
Figure 6D:
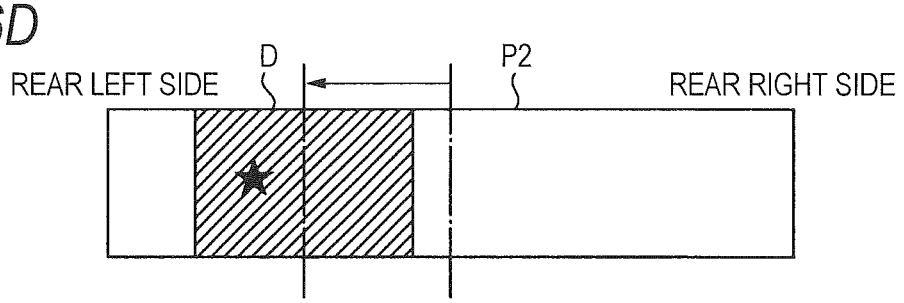
Figure 6E:
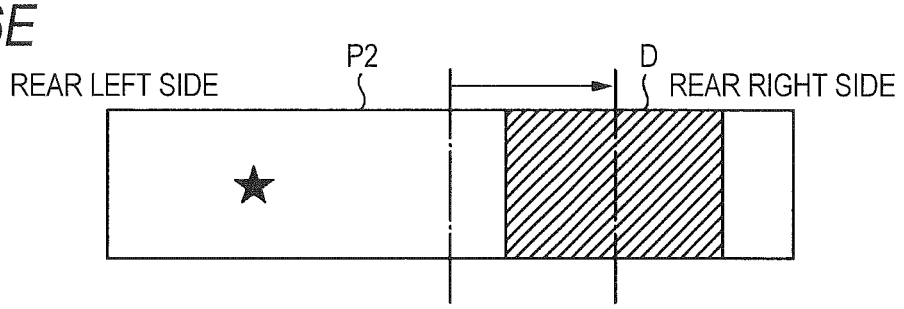
Figure 7A:
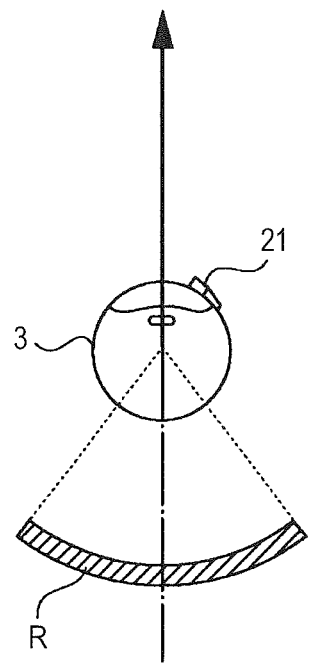
FIGS. 7A and 7B depict a relation between a head angle and an area that is to be displayed on a display screen as a rear image of the two-wheeled motor vehicle in the image display system according to the first illustrative embodiment of the disclosure.
Figure 7B:
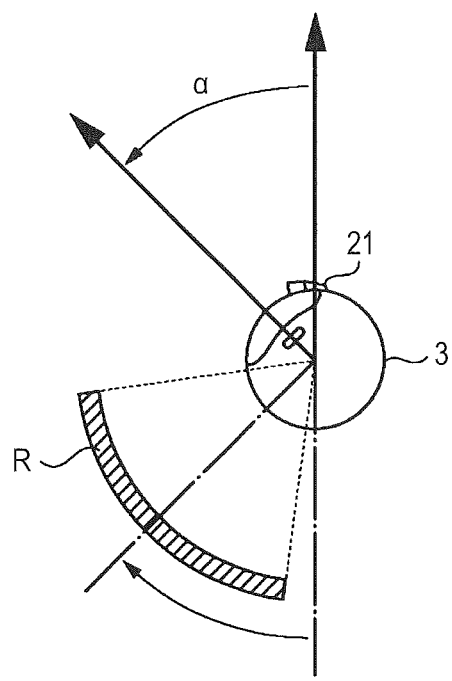

FIG. 5 depicts operations of the imaging device 11, the vehicle direction sensor 12, the control device 13 and the wireless communication device 14 provided for the two-wheeled motor vehicle 2. FIGS. 6A to 6E depict image processing that is to be executed by the image display control unit 33 of the control device 13. FIGS. 7A and 7B depict a relation between an area, which is to be displayed on the display screen 22B as a rear image of the two-wheeled motor vehicle 2, and the head angle α.

In FIG. 5, during the operation of the image display system 1, the imaging device 11 captures the rear of the two-wheeled motor vehicle 2 (step S1). Then, the imaging device 11 outputs an imaging signal indicative of the captured image to the control device 13, and the control device 13 receives the imaging signal. Herein, the image captured by the imaging device 11, i.e., the image corresponding to the imaging signal is referred to as "captured image." As shown in FIG. 6A, an entire area of the rear of the two-wheeled motor vehicle 2, which is within an imaging range of the imaging device 11, is reflected in a captured image P1. Also, a rear right side of the two-wheeled motor vehicle 2 is reflected at a left part of the captured image P1, and a rear left side of the two-wheeled motor vehicle 2 is reflected at a right part of the captured image P1. For example, an object (a star mark) positioned at a rear left side of the two-wheeled motor vehicle 2 in FIG. 3 is reflected at the right part in the captured image P1 shown in FIG. 6A.

Subsequently, the image reversal processing unit 32 of the control device 13 reverses the captured image P1 in the horizontal direction. Herein, the captured image reversed in the horizontal direction is referred to as "reversed captured image." As shown in FIG. 6B, the rear right side of the two-wheeled motor vehicle 2 is reflected at the right part of the reversed captured image P2, and the rear left side of the two-wheeled motor vehicle 2 is reflected at the left part of the reversed captured image P2. A direction of the reversed captured image P2 is the same as a direction of an image reflected on a rearview mirror of the two-wheeled motor vehicle 2. In this way, the captured image is reversed in the horizontal direction, so that it is possible to generate an image by which the driver can easily recognize the rear situation of the two-wheeled motor vehicle 2.

Subsequently, the vehicle direction sensor 12 detects the azimuth angle of the two-wheeled motor vehicle 2 (step S3). Then, the vehicle direction sensor 12 outputs a vehicle direction detection signal to the control device 13, and the control device 13 receives the vehicle direction detection signal.

Subsequently, the wireless communication device 14 provided for the two-wheeled motor vehicle 2 receives the head direction detection signal transmitted from the wireless communication device 24 of the head-mounted display unit 21 (step S4). Then, the wireless communication device 14 outputs the head direction detection signal to the control device 13, and the control device 13 receives the same.

Subsequently, the head angle calculation unit 31 of the control device 13 calculates the head angle α, which is an angle between the azimuth angle of the two-wheeled motor vehicle 2 and the azimuth angle of the user's head, based on the vehicle direction detection signal and the head direction detection signal (step S5).

Subsequently, the image display control unit 33 determines an image range of the reversed captured image P2, which is to be displayed on the display screen 22B, in accordance with the head angle α (step S6). Herein, the image range that is to be displayed on the display screen 22B is referred to as "display range."

A display range of the reversed captured image P2 corresponds to an area that is to be displayed on the display screen 22B as the rear image of the two-wheeled motor vehicle 2.

Specifically, when the head angle α is 0 degree, an area R that is to be displayed on the display screen 22B as the rear image of the two-wheeled motor vehicle 2 is right behind the two-wheeled motor vehicle 2, as shown in FIG. 7A. In this case, as shown in FIG. 6C, a display range D is a central portion in the horizontal direction of the reversed captured image P2. Also, as shown in FIG. 7B, as the head angle α approaches +90 degrees (90 degrees in a counterclockwise direction), the area R that is to be displayed on the display screen 22B as the rear image of the two-wheeled motor vehicle 2 moves to a rear left side of the two-wheeled motor vehicle 2. In this case, as shown in FIG. 6D, the display range D moves to a left part in the horizontal direction of the reversed captured image P2. On the other hand, as the head angle α approaches −90 degrees (90 degrees in a clockwise direction), the area that is to be displayed on the display screen 22B as the rear image of the two-wheeled motor vehicle 2 moves to a rear right side of the two-wheeled motor vehicle 2. In this case, as shown in FIG. 6E, the display range D moves to a right part in the horizontal direction of the reversed captured image P2.

Subsequently, the image display control unit 33 segments an image in the display range D from the reversed captured image P2 (step S7).

Subsequently, the image display control unit 33 outputs an image signal indicative of the segmented image, i.e., the image to be displayed on the display screen 22B. Herein, the image to be displayed on the display screen 22B is referred to as "display image." The image signal of the display image output from the image display control unit 33 is transmitted from the wireless communication device 14 of the two-wheeled motor vehicle 2 to the wireless communication device 24 of the head-mounted display unit 21. The processing of steps S1 to S8 is repeatedly executed during the operation of the image display system 1.

Figure 8:
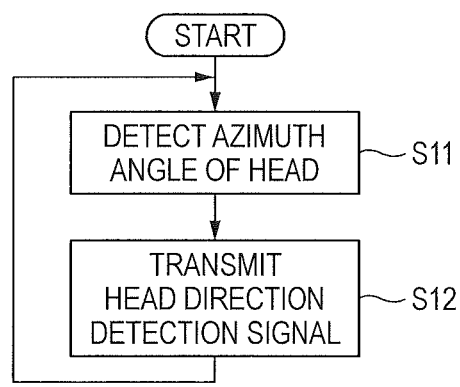
FIG. 8 is a flowchart depicting operations of a device provided for the helmet in the image display system according to the first illustrative embodiment of the disclosure.
Figure 9:
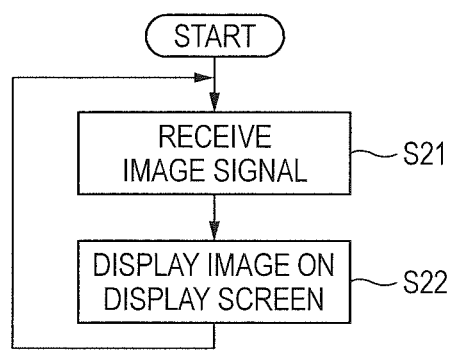
FIG. 9 is a flowchart depicting operations of the device provided for the helmet in the image display system according to the first illustrative embodiment of the disclosure.

FIGS. 8 and 9 depict operations of the display device 22, the head direction sensor 23 and the wireless communication device 24 provided for the head-mounted display unit 21.

In FIG. 8, during the operation of the image display system 1, the head direction sensor 23 detects the azimuth angle of the user's head (step S11). Then, the head direction sensor 23 outputs the head direction detection signal to the wireless communication device 24 of the head-mounted display unit 21. The head direction detection signal is transmitted from the wireless communication device 24 of the head-mounted display unit 21 to the wireless communication device 14 of the two-wheeled motor vehicle 2 (step S12), is input to the control device 13, and is then used to calculate the head angle α by the head angle calculation unit 31 of the control device 13.

Also, in FIG. 9, during the operation of the image display system 1, the image signal of the display image output from the image display control unit 33 of the control device 13 is transmitted by the wireless communication device 14 of the two-wheeled motor vehicle 2, is received by the wireless communication device 24 of the head-mounted display unit 21, and is input to the display device 22 (step S21). Then, the display device 22 displays an image corresponding to the input image signal on the display screen 22B (step S22).

As described above, according to the image display system 1 of the first illustrative embodiment of the disclosure, since the rear image of the two-wheeled motor vehicle 2 is displayed on the display screen 22B disposed close to the user's eyes, the user can easily see the rear image of the two-wheeled motor vehicle 2 simply by moving the line of sight from a state where the user sees ahead of the two-wheeled motor vehicle 2 by a short distance, during the driving of the two-wheeled motor vehicle 2. Thereby, during the driving, the user can recognize the rear situation of the two-wheeled motor vehicle 2 without neglecting seeing the front, which is a traveling direction of the two-wheeled motor vehicle 2. Also, since a distance between a position of the user's eye and the display screen 22B is short, the user can clearly see the image displayed on the display screen 22B. Also, according to the image display system 1, the head angle α is calculated using the detection results of the vehicle direction sensor 12 and the head direction sensor 23, and the area that is to be displayed on the display screen 22B as the rear image of the two-wheeled motor vehicle 2 is changed on the basis of the head angle α. Therefore, the user can change the area, which is to be displayed on the display screen 22B as an image, simply by changing a direction of the user's head in the horizontal direction, and can check the rear wide range area of the two-wheeled motor vehicle 2 through the display screen 22B.

Also, according to the image display system 1, the rear wide range area of the two-wheeled motor vehicle 2 is captured by the imaging device 11, a part of the resultant image is segmented and displayed on the display screen 22B, and a range in which the image is to be segmented is changed in accordance with the head angle α. Therefore, the imaging device 11 can be simply configured just by fixing the single imaging device 11 to the two-wheeled motor vehicle 2.

Second Illustrative Embodiment

Figure 10:
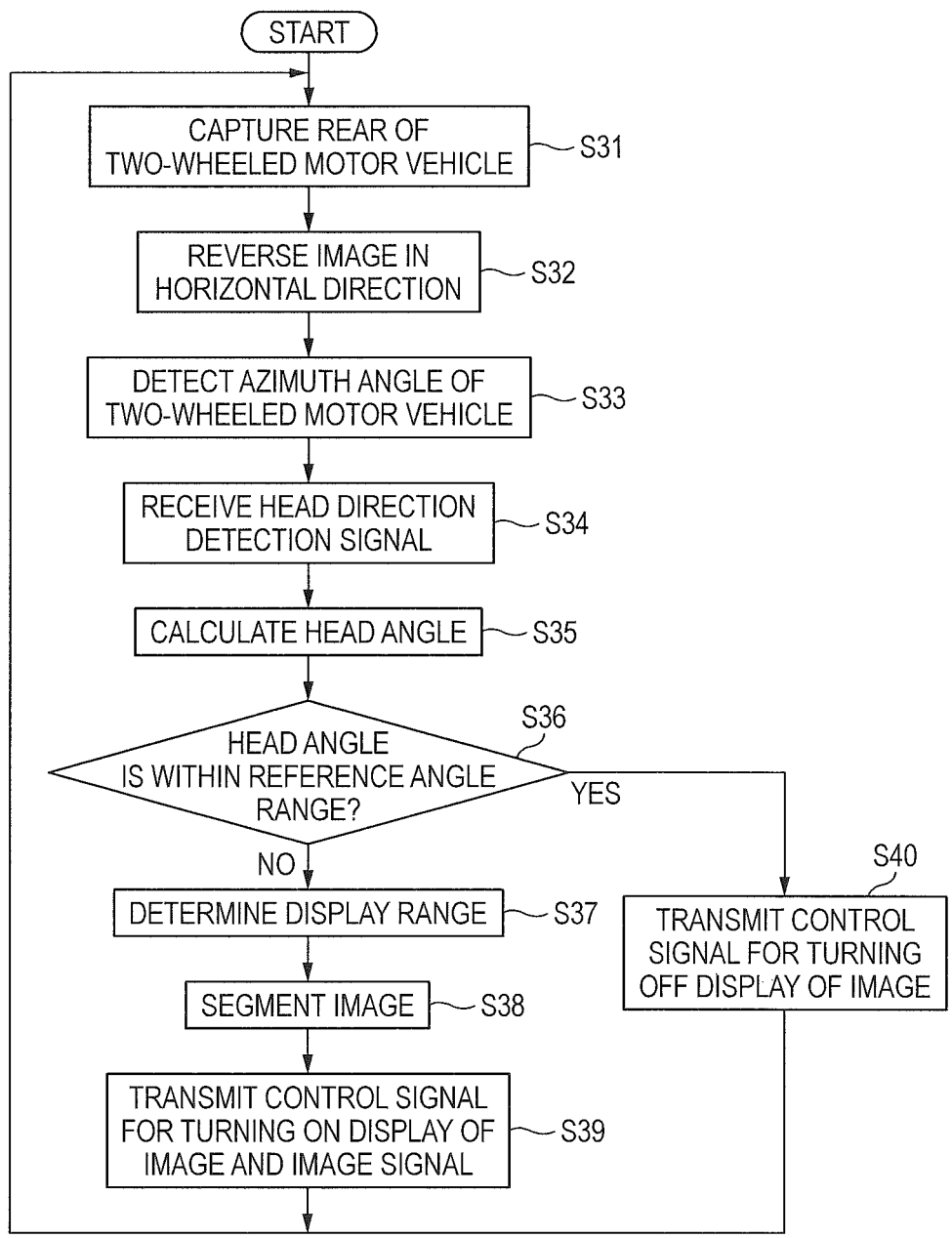
FIG. 10 is a flowchart depicting operations of an image display system according to a second illustrative embodiment of the disclosure.

FIG. 10 depicts operations of an image display system according to a second illustrative embodiment of the disclosure. As shown in FIG. 10, during the operations of the image display system according to the second illustrative embodiment of the disclosure, the rear of the two-wheeled motor vehicle 2 is captured by the imaging device 11 (step S31), the captured image is reversed in the horizontal direction (step S32), the azimuth angle of the two-wheeled motor vehicle 2 is detected (step S33), the head direction detection signal is received (step S34), and the head angle α is calculated (step S35). The corresponding operations are the same as those of the image display system 1 according to the first illustrative embodiment of the disclosure (refer to steps S1 to S5 in FIG. 5).

In the image display system according to the second illustrative embodiment of the disclosure, after calculating the head angle α, the image display control unit 33 determines whether the head angle α is within a predetermined reference angle range (step S36). The reference angle range is set to an angle range in which it can be determined that the user's head substantially faces ahead of the two-wheeled motor vehicle 2. The reference angle range may be set to −5° to +5°, −10° to −10 or −15° to +15°, for example. Also, the reference angle range can be arbitrarily set by the user.

When it is determined that the head angle α is within the reference angle range (step S36: YES), the image display control unit 33 does not display the image captured by the imaging device 11 on the display screen 22B. Specifically, the image display control unit 33 does not execute the processing of determining the display range and the processing of segmenting the display image from the reversed captured image. Instead of these processing, the image display control unit 33 outputs a control signal for turning off the display of the display screen 22B (step S40). The control signal is transmitted from the wireless communication device 14 of the two-wheeled motor vehicle 2 to the wireless communication device 24 of the head-mounted display unit 21, and is input to the display device 22. The display device 22 turns off the display of the display screen 22B in accordance with the control signal.

On the other hand, when it is determined that the head angle α is not within the reference angle range (step S36: NO), the image display control unit 33 determines the display range and segments the display image from the reversed captured image, like the processing of steps S6 and S7 in the first illustrative embodiment of FIG. 5. Subsequently, the image display control unit 33 outputs the display image. At this time, the image display control unit 33 outputs a control signal for turning on the display of the display screen 22B (step S39). The image signal and the control signal output from the image display control unit 33 are transmitted from the wireless communication device 14 of the two-wheeled motor vehicle 2 to the wireless communication device 24 of the head-mounted display unit 21, and are input to the display device 22. The display device 22 turns on the display of the display screen 22B in accordance with the input control signal, and displays an image corresponding to the input image signal on the display screen 22B.

According to the image display system of the second illustrative embodiment of the disclosure, when the user's head faces ahead of the two-wheeled motor vehicle 2, the image is not displayed on the display screen 22B. Also, even though the user's head moves in the horizontal direction and the moving direction deviates from the front of the two-wheeled motor vehicle 2, when a degree of the deviation is negligible and the user's head substantially faces ahead of the two-wheeled motor vehicle 2, the image is not displayed on the display screen 22B. Thereby, when it is totally unnecessary to check the rear of the two-wheeled motor vehicle 2, for example, the user can secure the wide front viewing field by substantially facing the head towards the front.

Figure 11:
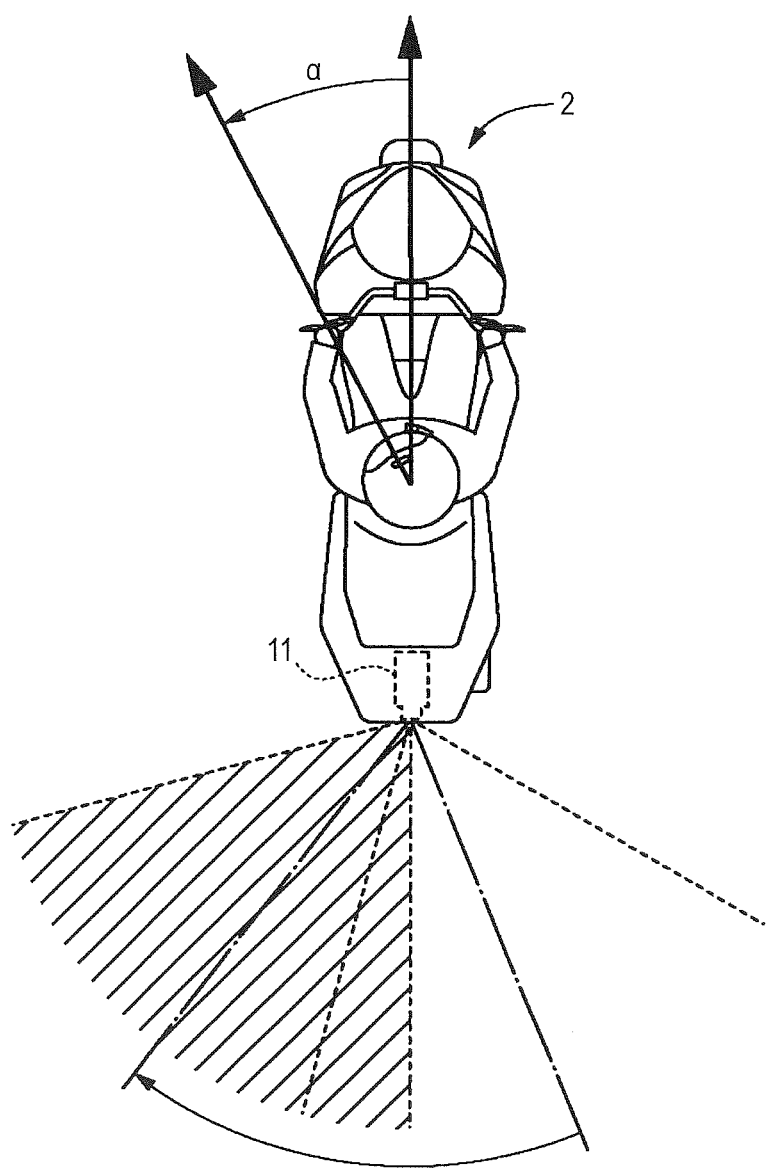
FIG. 11 depicts another illustrative embodiment of the image display system of the disclosure.

Meanwhile, in the above illustrative embodiments, as the method of displaying the image of the partial rear area of the two-wheeled motor vehicle 2 on the display screen 22B, the case where the rear wide range area of the two-wheeled motor vehicle 2 is captured by the imaging device 11, a part of the resultant image is segmented and displayed on the display screen 22B, and the segmenting range of the image is changed in accordance with the head angle α has been exemplified. However, the disclosure is not limited thereto. For example, the imaging direction of the imaging device 11 may be changed in accordance with the head angle α. For example, as shown in FIG. 11, a mechanism configured to rotate the imaging device 11 in the horizontal direction may be provided for the two-wheeled motor vehicle 2, and the imaging device 11 may be rotated in accordance with the head angle α by the control device 13, thereby changing the imaging direction. Also, a plurality of imaging devices may be fixed to the two-wheeled motor vehicle 2 so that imaging directions thereof are different, any one of image signals to be output from the respective imaging devices may be selected in accordance with the head angle α by the control device 13, thereby substantially changing the imaging direction. In this way, the image processing such as the image segmenting processing may be omitted by changing the imaging direction of the imaging device in accordance with the head angle α.

Also, in the above illustrative embodiments, the rear image of the two-wheeled motor vehicle 2 is displayed on the display screen 22B. However, in addition to this, information indicating a vehicle speed, an engine revolution or a gear position of the two-wheeled motor vehicle 2, or indicating that the two-wheeled motor vehicle 2 is not normal, and the like may be displayed on the display screen 22B. Specifically, the control device 13 may be configured to transmit the information of the vehicle speed, the engine revolution or the gear position, which are to be used to control the traveling of the two-wheeled motor vehicle 2, the information indicating that the two-wheeled motor vehicle 2 is not normal, and the like to the display device 22 of the head-mounted display unit 21 via the wireless communication devices 14, 24, and the display device 22 may be configured to display the information on the display screen 22B. Thereby, the user can easily and clearly recognize the situations of the vehicle through the display screen 22B disposed close to the eyes.

Also, in the above illustrative embodiments, the angle between the azimuth angle of the two-wheeled motor vehicle 2 and the azimuth angle of the user's head is used as the head angle. However, the disclosure is not limited thereto. For example, a reference axis may be set in a horizontal plane, an angle of the two-wheeled motor vehicle 2 relative to the axis in the horizontal plane and an angle of the user's head relative to the axis in the horizontal plane may be detected and a difference between the angles may be used as the head angle.

Also, in the above illustrative embodiments, the helmet 3 has been exemplified as the head-mounted device to which the head-mounted display unit 21 is to be attached. However, the disclosure is not limited thereto. For example, the head-mounted device may be goggles or glasses.

Also, in the above illustrative embodiments, the image display system 1 of the disclosure is used as a system configured to display the rear image of the two-wheeled motor vehicle 2. However, the disclosure is not limited thereto. For example, the disclosure may be used as a system configured to display an image of an area, which is a dead area of the driver of the vehicle, in addition to the rear of the vehicle. In this case, the head angle is not limited to the angle in the horizontal direction and may include an angle in a vertical direction or angle components in the horizontal and vertical directions.

Also, the disclosure can be appropriately changed without departing from the gist or spirit of the disclosure, which can be understood from the claims and the specification, and an image display system having the changes is also included in the technical spirit of the disclosure.

What is claimed is:

1. An image display system comprising:
   an imaging device provided for a vehicle and configured to capture a partial area of surroundings of the vehicle;
   a display device provided for a head-mounted device, which is to be mounted to user's head, and having a display screen, the display screen being disposed at a position that is within a front viewing field of a user wearing the head-mounted device;
   a control device configured to display an image captured by the imaging device on the display screen;
   a vehicle direction sensor configured to detect a direction of the vehicle; and
   a head direction sensor configured to detect a direction of the head,
   wherein the control device comprises:
      a head angle calculation unit configured to calculate a head angle, which is an angle between the direction of the vehicle and the direction of the head, based on the direction of the vehicle detected by the vehicle direction sensor and the direction of the head detected by the head direction sensor; and
      an image display control unit configured to change an area that is to be displayed on the display screen as an image of the surroundings of the vehicle, in accordance with the head angle calculated by the head angle calculation unit.

2. The image display system according to claim 1, wherein the image display control unit is configured to display a part of the image captured by the imaging device on the display screen, and to change an image range, which is to be displayed on the display screen, of the image captured by the imaging device, in accordance with the head angle calculated by the head angle calculation unit.

3. The image display system according to claim 1, wherein the image display control unit is configured to change an imaging direction of the imaging device, in accordance with the head angle calculated by the head angle calculation unit.

4. The image display system according to claim 1, wherein the image display control unit does not display the image captured by the imaging device on the display screen when the head angle calculated by the head angle calculation unit is within a predetermined reference angle range including zero (0) degree.

5. The image display system according to claim 1, further comprising:
   a first wireless communication device provided for the head-mounted device; and
   a second wireless communication device provided for the vehicle,
   wherein the first wireless communication device is configured to transmit a head direction detection signal, which is to be output from a head direction sensor provided for the head-mounted device and indicates the direction of the head, to the second wireless communication device, and the second wireless communication device is configured to output the head direction detection signal received from the first wireless communication device to the head angle calculation unit of the control device provided for the vehicle, and
   wherein the second wireless communication device is configured to transmit an image signal, which is to be output from the image display control unit and corresponds to an image to be displayed on the display screen, to the first wireless communication device, and the first wireless communication device is configured to output the image signal received from the second wireless communication device to the display device.

6. The image display system according to claim 5, wherein the display device, the head direction sensor and the first wireless communication device are integrated and attached to the head-mounted device.

7. The image display system according to claim 1,
   wherein the imaging device is configured to capture a rear of the vehicle,
   wherein the head angle calculation unit is configured to calculate, as the head angle, an angle in a horizontal plane between the direction of the vehicle and the direction of the head, based on the direction of the vehicle detected by the vehicle direction sensor and the direction of the head detected by the head direction sensor, and
   wherein the control device comprises an image reversal processing unit configured to reverse an image to be displayed on the display screen in a horizontal direction.

8. The image display system according to claim 1, wherein the control device is configured to display information indicating a vehicle speed, an engine revolution or a gear position of the vehicle or indicating that the vehicle is not normal on the display screen.

* * * * *